United States Patent
Giladi

(10) Patent No.: US 9,438,654 B2
(45) Date of Patent: Sep. 6, 2016

(54) FRAGMENT INTERFACE INTO DYNAMIC ADAPTIVE STREAMING OVER HYPERTEXT TRANSFER PROTOCOL PRESENTATIONS

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 229 days.

(21) Appl. No.: 14/256,393

(22) Filed: Apr. 18, 2014

(65) Prior Publication Data

US 2014/0317306 A1 Oct. 23, 2014

Related U.S. Application Data

(60) Provisional application No. 61/813,545, filed on Apr. 18, 2013.

(51) Int. Cl.
*G06F 15/16* (2006.01)
*H04L 29/06* (2006.01)

(52) U.S. Cl.
CPC ........... *H04L 65/602* (2013.01); *H04L 65/608* (2013.01); *H04L 65/80* (2013.01)

(58) Field of Classification Search
CPC ............. H04L 65/602; H04L 65/1016; H04L 65/608; H04L 65/60; H04L 47/2416; H04N 21/4305
See application file for complete search history.

(56) References Cited

U.S. PATENT DOCUMENTS

| | | | | |
|---|---|---|---|---|
| 2011/0119395 A1* | 5/2011 | Ha | ....................... | H04L 47/2416 709/231 |
| 2013/0111028 A1* | 5/2013 | Kondrad | ............. | H04L 65/1016 709/225 |
| 2014/0222962 A1* | 8/2014 | Mao | .................... | H04N 21/4305 709/219 |

OTHER PUBLICATIONS

"Technologies under Consideration for Dynamic Adaptive Streaming over HTTP 23009, parts 1 and 4," International Organisation for Standardization, Coding of Moving Pictures and Audio, ISO/IEC JTC1/SC29/WC11 MPEG2011/N13081, Shanghai, China, Oct. 2012, 19 pgs.
"XPointer Framework," 2003 W3C (MIT, ERCIM, Keio), 13 pgs.
"Media Fragments URI 1.0 (basic)," 2012 W3C (MIT, ERCIM, Keio), 21 pgs.
"Information technology—Dynamic adaptive streaming over HTTP (DASH)—Part 1: Media presentation description and segment formats," International Standard, ISO/IEC FDIS 23009-1:2013(E), ISO/IEC JTC 1/SC 29/WG 11, Aug. 2, 2013, 150 pgs.
Thomson, M. et al., "Discovering the Local Location Information Server (LIS)," Internet Engineering Task Force (IETF), Standards Track, Sep. 2010, RFC 5986, pp. 1-16.

* cited by examiner

*Primary Examiner* — Yves Dalencourt
(74) *Attorney, Agent, or Firm* — Conley Rose, P.C.; Grant Rodolph; Jonathan K. Polk

(57) ABSTRACT

A method of Dynamic Adaptive Streaming over Hypertext Transfer Protocol (HTTP) (DASH) comprising accessing a DASH media presentation at a given time of a period on a media timeline of the DASH media presentation, and determining one or more parameters to express a state of the DASH media presentation, wherein the parameters comprise a temporal parameter that indicates the given time, and wherein the given time is relative to a start of the period.

17 Claims, 4 Drawing Sheets

FRAGMENT INTERFACE INTO DYNAMIC ADAPTIVE STREAMING OVER HYPERTEXT TRANSFER PROTOCOL PRESENTATIONS

CROSS-REFERENCE TO RELATED APPLICATIONS

The present application claims benefit of U.S. Provisional Patent Application No. 61/813,545 filed Apr. 18, 2013 by Alexander Giladi and entitled "Fragment Interface Into Dynamic Adaptive Streaming Over Hypertext Transfer Protocol Presentations," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to users using different coding schemes suited for different devices, such as televisions, notebook computers, and mobile handsets. An asset may comprise media content and metadata expressed as a media presentation description (MPD). The MPD may be an extensible markup language (XML) file or document describing the media content, such as its various representations, uniform resource locator (URL) addresses, and other characteristics. For example, the media content may comprise several media components (e.g. audio, video, and text), each of which may have different characteristics that are specified in the MPD.

Depending on the application, an asset or media content may be divided into various hierarchies. For example, the media content may comprise multiple periods, where a period is a time interval relatively longer than a segment. For instance, a television program may be divided into several 5-minute-long program periods, which are separated by several 2-minute-long advertisement periods. Further, a period may comprise at least one adaptation set (AS). An AS may provide information about one or multiple media components and its/their various encoded representations. For instance, an AS may contain different bit-rates of a video component of the media content, while another AS may contain different bit-rates of an audio component of the same media content. A representation may be an encoded alternative of a media component, varying from other representations by bit-rate, resolution, number of channels, or other characteristics, or combinations thereof. Each representation comprises multiple segments, which are media content chunks in a temporal sequence.

In adaptive streaming, when delivering a media content to a user device, the user device may select appropriate segments dynamically based on a variety of factors, such as network conditions, device capability, and user choice. Adaptive streaming may include various equivalent technologies and/or standards, such as Dynamic Adaptive Streaming over Hypertext Transfer Protocol (HTTP) (DASH), HTTP Live Streaming (HLS), or Internet Information Services (IIS) Smooth Streaming. For example, DASH defines a manifest format, MPD, and segment formats for International Organization for Standardization (ISO) Base Media File Format (ISO-BMFF) and Moving Picture Experts Group (MPEG) Transport Stream under the family of standards MPEG-2, as described in ISO/International Electrotechnical Commission (IEC) 13818-1, titled "Information Technology—Generic Coding of Moving Pictures and Associated Audio Information: Systems."

SUMMARY

In one embodiment, the disclosure includes a method of DASH comprising accessing a DASH media presentation at a given time of a period on a media timeline of the DASH media presentation, and determining one or more parameters to express a state of the DASH media presentation, wherein the parameters comprise a temporal parameter that indicates the given time, and wherein the given time is relative to a start of the period.

In another embodiment, the disclosure includes an apparatus used in DASH, the apparatus comprising one or more processors configured to access a DASH media presentation at a given time of a period on a media timeline of the DASH media presentation, determine one or more parameters to express a state of the DASH media presentation, wherein the parameters comprise a temporal parameter that indicates the given time, and wherein the given time is relative to a start of the period, and specify the parameters in an MPD for the DASH media presentation, and a memory device coupled to the one or more processors and configured to store the MPD.

In yet another embodiment, the disclosure includes a computer program product comprising computer executable instructions stored on a non-transitory computer readable medium such that when executed by a processor cause a media streaming client device to retrieve an MPD for a media presentation, the MPD comprising one or more parameters that indicate an access state of the media presentation, the media presentation comprising a plurality of periods, each period comprising one or more adaptation sets, each adaptation set comprising one or more representations, retrieve a set of representations based on the parameters in the MPD, and playback the retrieved set of representations.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for determining, expressing, and sharing of a state of a media presentation (e.g., a DASH media presentation) via the use of parameters in an MPD for the media presentation. The media presentation may comprise a plurality of periods, each period comprising one or more adaptation sets, and each adaptation set comprising one or more representations. In an embodiment, when accessing or playing a DASH media presentation at a given time of a period on a media timeline, a client device may determine one or more parameters to express a state of the DASH media presentation. The state of the media presentation may include various information of the DASH media presentation, such as which period, what time in the period, which adaptation set, which representation, and which segments were being accessed or played. Exemplary parameters disclosed herein include, but are not limited to, time parameter, period parameter, state parameter, and selection parameter, etc. Depending on the application, any suitable amount of information may be defined by parameters for expression of the presentation state. The parameters may be specified in the MPD and stored for future use (e.g., playback) or sharing (e.g., via bookmarks to other client devices).

Figure 1:
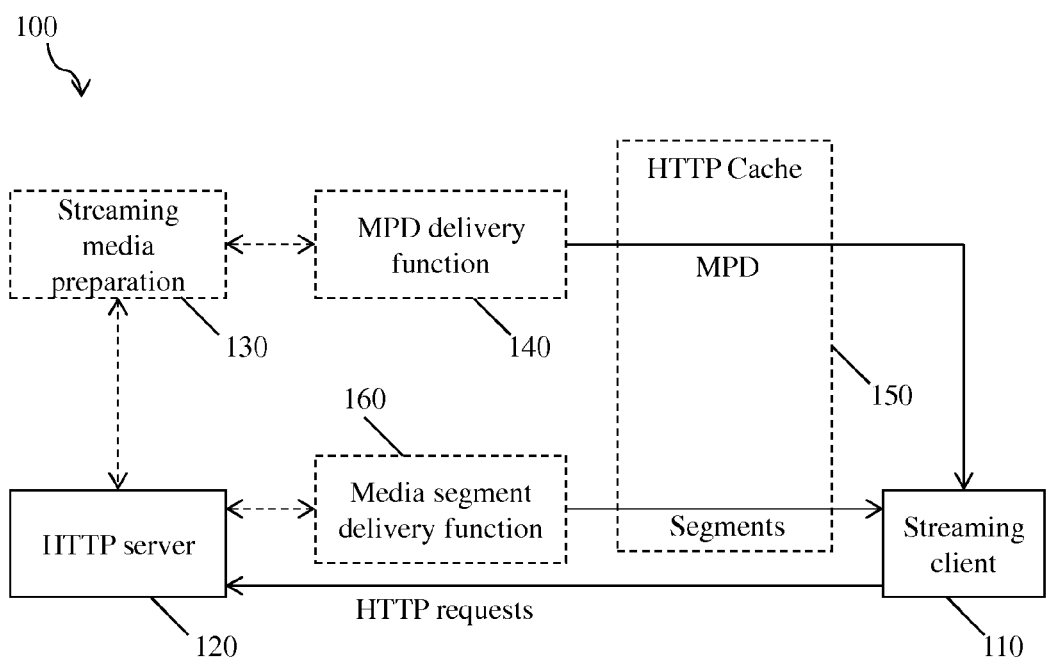
FIG. 1 is a schematic view of an embodiment of a media streaming system.

FIG. 1 illustrates an embodiment of a media streaming system 100, which may be implemented to deliver media contents from an HTTP server 120 to a streaming client 110. For example, the streaming system 100 may be a DASH system, in which case the streaming client 110 is a DASH client. The streaming system 100 may also be another type of streaming system. The streaming client 110 may be a program or application implemented in an operating system of a user device, or it may be a web client accessed in a web platform. A media content, sometimes referred to as an asset, stored in the HTTP server 120 may be generated or prepared by a streaming media preparation unit 130. The media preparation unit 130 may be located in the HTTP server 120 or elsewhere (e.g., in a content provider). The HTTP server 120 may be part of a content provider or may be a node in a content distribution network (CDN). The media content may be generated by the content provider and then transmitted to a CDN node. The media content in the HTTP server 120 may comprise an MPD and a plurality of segments. If desired, the MPD and the segments may be stored in different servers and sent to the streaming client 110 from different servers. In addition, the HTTP server 120 described herein merely serves as an example of a server, it should be understood that embodiments disclosed herein may also be implemented in any other suitable type of server.

In the streaming system 100, the streaming client 110 may send a request to the HTTP server 120 for media content. In response, the HTTP server 120 may first use an MPD delivery function 140 to deliver an MPD to the streaming client 110. The MPD can be delivered using HTTP, email, thumb drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content. Using this information, the streaming client 110 may select the appropriate encoded representation or alternative and start streaming of the media content by fetching segments using HTTP GET requests.

The HTTP server 120 may further use a media segment delivery function 160 to deliver the segments to the streaming client 110. The streaming client 110 may download segments from a plurality of HTTP servers, e.g., to maximize usage of network bandwidth. The streaming client 110 may render the downloaded media appropriately so as to provide streaming service to a user of the streaming client 110. Although the streaming client 110 may obtain the segments based on locations specified by URLs contained in the MPD, sometimes the MPD and/or the segments may be stored in an HTTP cache 150 so that the streaming client 110 may receive them more efficiently. The HTTP cache 150 may reside in the HTTP server 120, the streaming client 110, or a CDN node.

In DASH services, after appropriate buffering to allow for network throughput variations, the streaming client 110 may continue to download subsequent segments while monitoring bandwidth fluctuations of the network. Depending on its measurements, the streaming client 110 may adaptively adjust streaming to the available bandwidth by downloading segments of different representations (e.g., with a lower or higher bit-rate) to maintain an adequate buffer.

Figure 2:
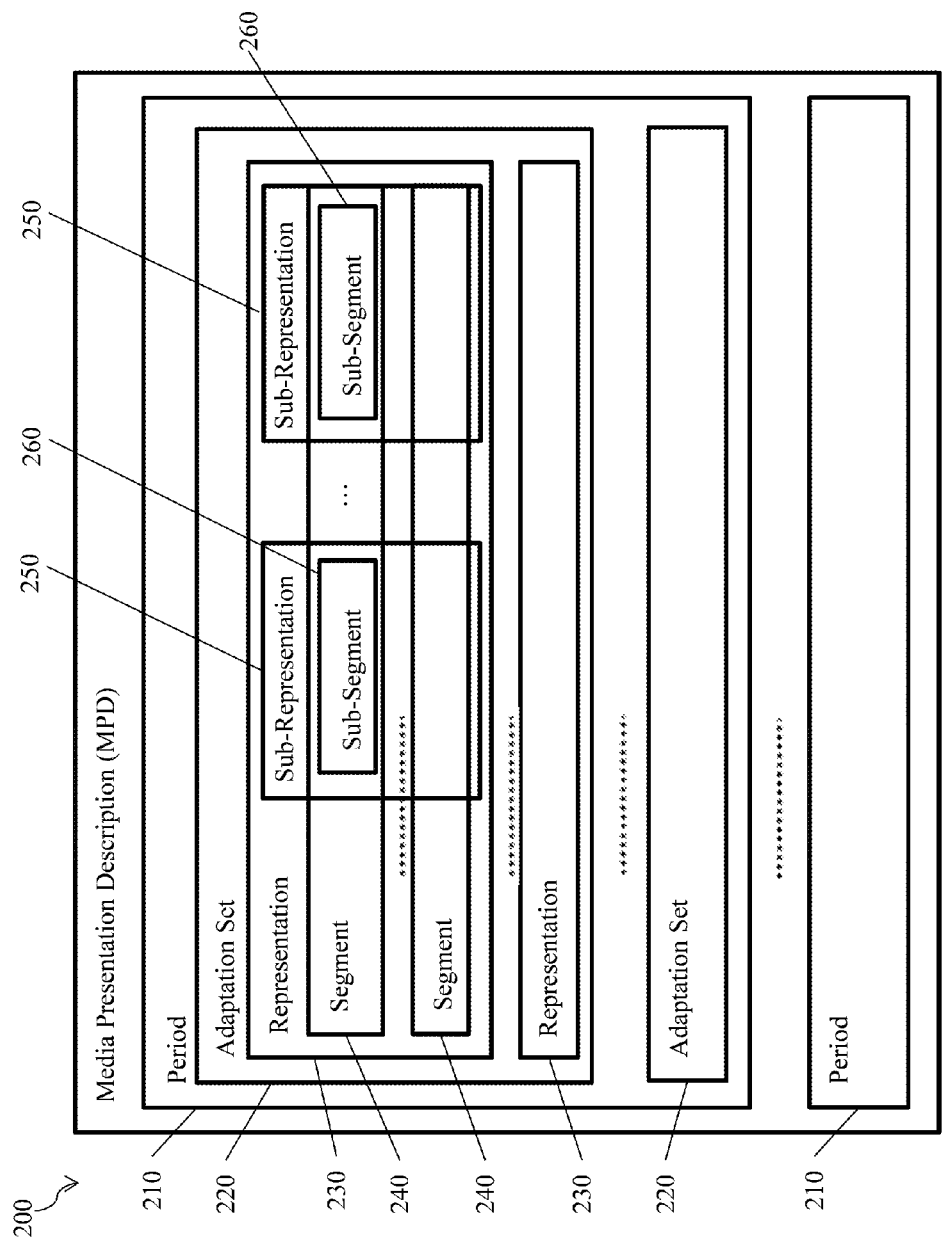
FIG. 2 is a schematic diagram of an embodiment of an MPD.

FIG. 2 is a schematic diagram of an embodiment of an MPD 200 used in media streaming. In an embodiment, an HTTP server (e.g., HTTP server 120 as shown in FIG. 1) may generate the MPD 200, which is a hierarchical data model. The MPD 200 may be implemented as one or more documents containing functional metadata that describes a media presentation, sometimes referred to as media content. In accordance with ISO/IEC 23009-1, the MPD 200 may be referred to as a formalized description for a media presentation for the purpose of providing a streaming service. In one embodiment, the MPD 200 may be an XML document. Although the MPD 200 provides metadata necessary to access and present the content, the MPD 200 may not describe the content itself.

A media presentation, in turn, may be referred to as a collection of data that establishes a presentation of media content. For example, the MPD 200 may comprise elements that describe media content in terms of periods, adaptation sets, segments, representations, and other information. In particular, the MPD 200 may define formats to announce HTTP URLs, or network addresses, for downloading segments of data content. The MPD 200 may comprise a plurality of URLs, and/or metadata, to be used by a DASH client to construct a plurality of URLs, pointing to one or more HTTP servers for downloading segments of data. An asset disclosed herein may comprise the MPD and the media presentation. In the context of DASH, an asset may refer to content including media and metadata together with the rights to use the content by the content provider.

The MPD 200 may comprise various elements and/or attributes including, for example, Period 210, Adaptation Set 220, Representation 230, and Sub-Representation 250. The MPD 200 may contain references to Segments 240, and Segment 240 may contain information that describes Sub-Segment 260. The Period 210 may be associated with a period of data content. In accordance with ISO/IEC 23009-1, the Period 210 may represent a media content period during which a consistent set of encoded versions of the media content is available. In other words, the set of available bit-rates, languages, captions, subtitles, etc., does not change during a period. An Adaptation Set 220 may comprise a set of mutually interchangeable Representations 230. A Representation 230 may describe a deliverable encoded version of one or several media content components. The DASH client may switch from representation to representation in order to adapt to network conditions or other factors. The DASH client may determine if it can support a specific Representation 230. If not, then the DASH client may select a different Representation 230 that it can support. A Segment 240 may be referred to as a unit of data associated with a URL. In other words, a Segment 240 may generally be the largest unit of data that can be retrieved with a single HTTP request using a single URL. The DASH client may be configured to download each segment within the selected Representation 230 until the DASH client ceases downloading or until the DASH client selects another Representation 230. Additional details for the Segment 240, the Sub-Representation 250, and the Sub-Segment 260 elements are described in ISO/IEC 23009-1.

The Period 210, Adaptation Set 220, Representation 230, and Sub-Representation 250 may describe data referring to Segment 240 and Sub-Segment 260. In an MPD, elements and attributes may be similar to those defined in XML. Elements may be distinguished from attributes by uppercase first letters or camel-casing, as well as bold face, though bold face is removed herein. Each element may comprise one or more attributes, which may be properties that further define the element. Attributes may be distinguished by a preceding @ symbol. For example, the Period 210 may comprise an @ start attribute that may specify when on a presentation timeline a period associated with the Period 210 begins.

When streaming an asset comprising main media content (e.g., a movie or a sporting event), it is common to insert other contents such as advertisements (ads) or commercials between periods of the main media content. The inserted content may have any non-main content, that is, any content that is different from the main media content being played out. In case of ad insertion, each ad may occupy a single period, while the asset itself may be split into multiple periods. For example, an MPD for a video on demand (VoD) asset may comprise several 15-minute periods that belong to an asset, which are separated by one or more 3-minute ad breaks. One or more ads with the same or different contents may be played during an ad break.

Anchor-based addressing into a DASH MPD was accepted into the DASH Technology under Consideration (TuC) in the spring of 2012. The present disclosure builds upon that work and proposes a solution to a practical question "how to start playing a given set of adaptation sets in a media presentation at any given time?"

One implementation of splicing (joining contents) in DASH is by running two different DASH access clients, with one playing a main media presentation (e.g., a movie) and the other playing inserted content (e.g., an advertisement or commercial). However, such an approach may prove expensive in practice. In an alternative embodiment, a single DASH access client may be used and initialized with different presentation states. An application (e.g., a media player) may make a decision to switch between the two states, save the state of the first presentation (e.g., a movie), and initialize the client with the state of the second presentation (e.g., an advertisement). When the second presentation ends or when playing is interrupted, the client may be initialized with the saved state of the first presentation. In this case, the playout or the access of the first presentation may be resumed. If desired, resumed access may keep features of the saved state of the first presentation, e.g., being in the same language with the same subtitles. In an additional optimization embodiment, the resumed access may continue from the segment at which the first presentation was stopped or interrupted.

An extension of this use case is bookmarking to share a media presentation state among different media streaming client devices. In an embodiment, a first client device may generate one or more bookmarks indicating the state of the DASH media presentation. Then, the first client device may share the state of the DASH media presentation by sending the bookmarks to an over-the-top content (OTT) provider to allow other client devices to play the DASH media presentation from the given time after obtaining the bookmarks from the OTT provider. For instance, the OTT provider may save a bookmark generated by the user in its database, thus a user logging in from any client device may be able to resume playout from the given time.

Further, sharable bookmarks may be implemented in other ways. In an embodiment, a first client device may share the DASH media presentation by sending a link comprising the given time to a second client device to allow the second client device to play the DASH media presentation from the given time. For example, the first client device can share a link to a specific scene in a movie via an e-mail, text, social network (e.g., TWITTER, FACEBOOK, etc.) or any other means. In this case, only time may be needed, as different users or client devices may prefer or need different adaptation sets, e.g., with different languages and/or subtitles (some may need subtitles). Moreover, embodiments disclosed herein may also support other cases such as persistent user preferences, e.g., when a user wants to receive a specific selection of languages and subtitles in by default in every movie or other type of media presentation.

In an embodiment, there may be several desirable features when determining the access state of a media presentation. First, one adaptation set (identified by a state parameter) or a group of adaptation sets (identified by a selection parameter) may be addressed. Second, a given moment in time or a continuous time range (a temporal state identified by a temporal parameter) may be addressed. Third, an internal state (e.g., which representations were selected for the first time, and which segments were playing) may be restored. Fourth, it may be desirable to reuse existing standards as much as possible.

In an embodiment, a DASH access client state, sometimes referred to as the state of a DASH media presentation, may be characterized by a set of tuples $(R,S(i))$, where R denotes a representation, and $S(i)$ denotes one or more segments that were playing. A fine-granularity addressing mode is $(R, t)$, where t denotes time, and $S(i)$ may be calculated by the client. As segment $S(i)$ may start playing at time T0 and last till time T1, starting from $S(i)$ means starting from T0. Time (e.g., T0<t<T1) is independent of segment duration, thus purely time-based addressing is a more fine-grained approach. Since t may be shared among representations, the DASH access client state can be expressed concisely as $(\{R0, R1, \ldots, Rn, RN\}, t)$, where n between 0-N denotes a respective representation. In some embodiments, the state of a media presentation may only need to include selection parameters to specify a set of adaptation sets. Accordingly, the access client, e.g., when replaying the media presentation, may have the option to determine a set of representations by itself (in other words leaving representation selection to the access client).

DASH TuC provides a way of temporal addressing using World Wide Web Consortium (W3C) Media Fragments interface. As far as selecting a state is concerned, one way of unique addressing of an element or a set of elements in MPD is by using XPath function. Further, if one wishes to convert this into a URI, an XPointer function may provide an interoperable way of realizing the URI.

As disclosed herein, a variety of state parameters, such as time (t) parameter, state parameter indicating representations, and selection parameter indicating adaptation sets, may be used for the state of a media presentation. In an embodiment, the time parameter (interchange with temporal parameter) may be formatted as defined in a standard document entitled Media Fragments 1.0, which is a W3C Recommendation published on Sep. 25, 2012 and incorporated herein by reference. A value of the temporal parameter may be mapped to a media presentation timeline, also referred to as a media timeline of the presentation. A client may pass the relevant (sub)segment to a media engine, and may signal the exact time position within the (sub)segment to the media engine. The media timeline may be a concatenation of the timeline of periods, and may be common to all representations in a period. Since different representations and segments may be used in a period, in DASH, the media timeline may allow encoded versions of different media content components to share a common timeline. The presentation time of each access unit within the media content may be mapped to the global common presentation timeline for synchronization of different media components and to enable seamless switching of different coded versions of the same media components.

In an embodiment, the state parameter may identify a set of representation corresponding to representation elements in MPD, e.g., by using an XPointer expression. The client may check whether this set of representations can be played together (e.g., whether there is at most one representation from a single AdaptationSet and group). The client may then start playing the set of representations.

In an embodiment, the selection (sometimes denoted by select) parameter may identify a set of adaptation sets corresponding to AdaptationSet elements in MPD, e.g., by using an XPointer expression. The set of adaptation set may be a group comprising one or more adaptation sets. The client may check whether the set of adaptation sets can be played together (e.g., whether there are adaptation sets from the same group). The client may then determine and retrieve the best suited representations, and start playing.

In order to simplify implementations, in some embodiments, the state parameter and the select parameter may be designed as mutually exclusive. Thus, only one of them appears in a URL. Further, if a state parameter or a selection parameter is present, a given time indicated by a time parameter may be relative to the start of a selected period. Otherwise, if neither a state parameter nor a selection parameter is present, a given time indicated by a time parameter may be relative to the earliest period (e.g., start of the presentation), which has the earliest period start time (PeriodStart) among a plurality of periods in the DASH media presentation. In an alternative embodiment, global time may be used, so the client may select an appropriate period and express state relative to this period.

Figure 3A:
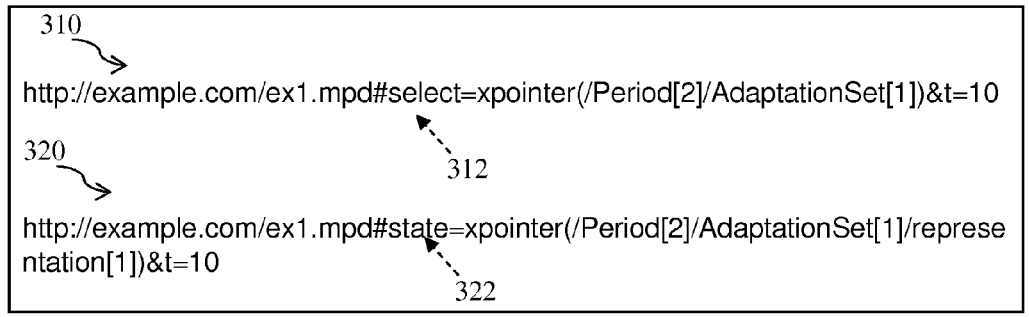
FIG. 3A illustrates exemplary constructed URLs.

In an embodiment, retrieving each representation may comprise constructing a URL address for the respective representation using an XML Pointer (XPointer) according to an XPointer Framework. FIG. 3A illustrates exemplary URLs constructed using an XPointer function. In the URL 310, the value of a selection parameter 312 (with a key denoted by select) identifies an adaptation set (AdaptationSet[1]) in a period (Period[2]). In the URL 320, the value of a state parameter 322 (with a key denoted by state) identifies a representation (representation[1]) in an adaptation set (AdaptationSet[1]) of the period (Period[2]). A simple shorthand notation for state or selection parameter may be #XPointer( . . . ) fragment. A parser in the client may determine whether it is a state or a selection based on element types of the returned set of nodes. For instance, if the client sees element type is representation, it is state; otherwise, if the client sees element type is adaptation set, it is selection.

URIs for resources, e.g., with Multipurpose Internet Mail Extensions (MIME) type application/dash+xml, may use URI fragment syntax to start a presentation at a given time and a given state. An MPD anchor may be a set of Representations being presented and a time offset from the start of a period on the media timeline. These are expressed using URI fragment syntax. The present disclosure defines a temporal parameter, position, and two context parameters (state and selection) in order to express the state of a DASH media presentation.

In an embodiment, a URI fragment starts with the "#" character, and is a string terminating the URI. MPD fragments may be a comma-separated list of key=value pairs, with syntax and semantics of key and value parameters defined in Table 1, which shows an embodiment of parameters for MPD Anchors.

TABLE 1

Exemplary parameters for MPD Anchors

| Key | Value | Semantics |
| --- | --- | --- |
| t | Time or time range in the same format as defined in Media Fragments URI 1.0 | Time since the beginning of the period indicated by the period parameter. If the t parameter is not present, its default value is 0. |
| period | String | Period@id. If period parameter is not present, the default value is the identifier (ID) of the Period with the earliest PeriodStart. |
| as | string | Value of a single AdaptationSet@id |
| track | string | Value of a single AdaptationSet@group |

Note that in Table 1, percent coding as defined in Request For Comments (RFC) 5986 may be used for all reserved characters in parameter values. Further, it should be understood that the ability to address elements in the MPD may depend on string parameters such as Period@id, AdaptationSet@id and AdaptationSet@group. Hence, MPD authors should put these attributes explicitly into the MPD (e.g., via a client device) if they intend to make MPDs addressable.

In the embodiment shown in Table 1, the parameters used to express a state of the DASH media presentation may comprise a temporal parameter. A key of the temporal parameter is denotable by "t", and a value of the temporal parameter is the given time or a time range including the given time. A format of the temporal parameter may be defined in a standard document entitled Media Fragments URI 1.0. If the t parameter is not present, its default value may be set to 0. The parameters may further comprise a period parameter, wherein a key of the period parameter is denotable by "period", and wherein a value of the period parameter identifies the period on the media timeline. If period parameter is not present, the default value may be set as the ID of the Period with the earliest PeriodStart, which is defined in the DASH standard document ISO/IEC 23009-1.

In the embodiment shown in Table 1, the parameters may further comprise a state parameter, wherein a key of the state parameter is denotable by "a s", and wherein a value of the state parameter identifies a single adaptation set. The parameters may further comprise a selection parameter, wherein a key of the selection parameter is denotable as "track", and wherein a value of the selection parameter identifies a single adaptation set group comprising a set of adaptation sets.

Figure 3B:
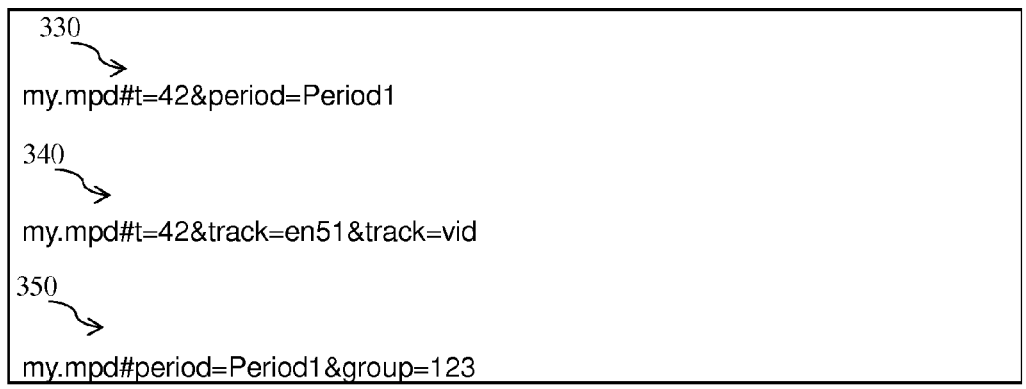
FIG. 3B illustrates examples of uniform resource identifier (URI) fragments for DASH.

FIG. 3B illustrates examples of URI fragments for DASH. When expressing the state of a DASH media presentation, a URI fragment 330 comprises a temporal parameter (t=42), and a period parameter (period=Period1) to indicate the 42nd minute of Period1.

In another example, a URI fragment 340 comprises a temporal parameter (t=42), a first selection parameter (track=en51), and a second selection parameter (track=vid) to indicate the 42nd minute from the start of the presentation, English 5.1 audio and video. In the URI fragment 340, the period parameter is not present, so the very first period of the presentation is used by default.

In yet another example, a URI fragment 350 comprises a period parameter (period=Period1) and a selection parameter (group=123) to indicate a set of Adaptation Sets starting from the start of Period1. In the URI fragment 350, the temporal parameter is not present, so the relative time to the Period1 is set to 0 by default.

Figure 4:
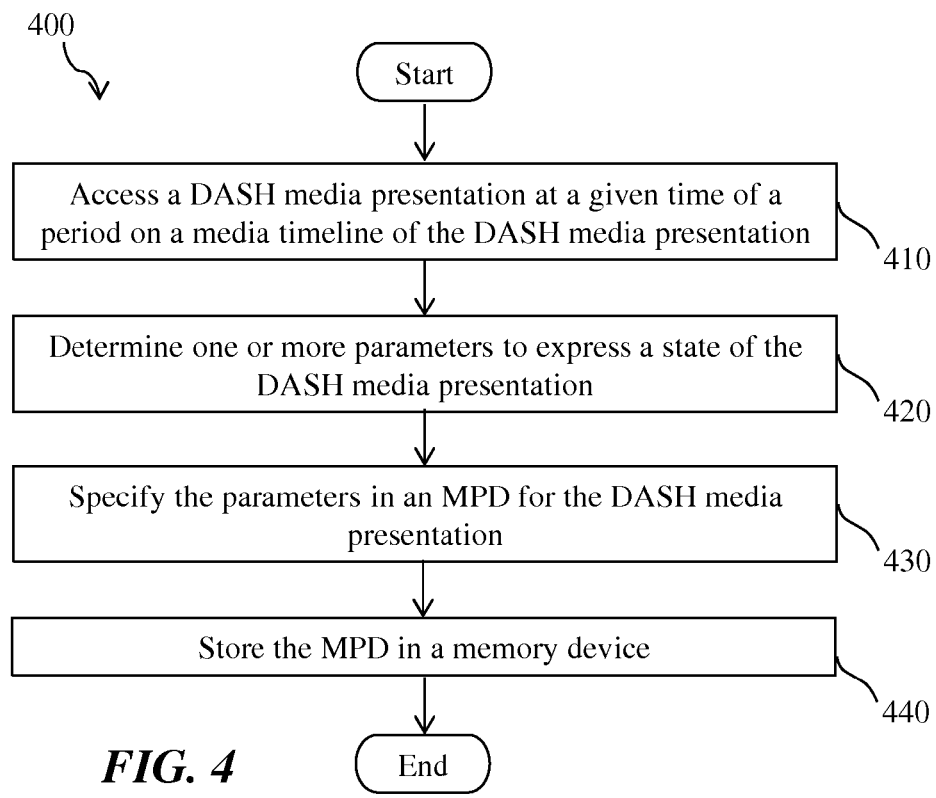
FIG. 4 is a flowchart of an embodiment of a method of DASH.

FIG. 4 illustrates an embodiment of a DASH method 400, which may be implemented by a network node serving as a DASH client. In step 410, the method 400 may access a DASH media presentation at a given time of a period on a media timeline of the DASH media presentation. Accessing the DASH media presentation may mean playing the presentation or any other purposes. In step 420, the method 400 may determine one or more parameters to express a state of the DASH media presentation. In an embodiment, the parameters comprise a temporal parameter that indicates the given time, wherein the given time is relative to a start of the period.

In step 430, the method 400 may specify the parameters in an MPD for the DASH media presentation. In an embodiment, the parameters may be specified as MPD anchors using URI fragment syntax, wherein a URI fragment following the URI fragment syntax starts with a "#" character and is a string terminating the URI.

In step 440, the method 400 may store the MPD in a memory device in any suitable fashion. Once the MPD is stored, it may be used for future playback or be shared with other media streaming client devices. For example, a streaming client may retrieve (locally or remotely) the MPD comprising one or more parameters that indicate an access state of the media presentation. The streaming client device may further retrieve a set of representations based on the parameters in the MPD, and playback the retrieved set of representations.

It should be understood that FIG. 4 is for illustration purposes only, thus its steps can be modified and additional steps may be added whenever necessary. The method 400 may further access a second media presentation that is different from the DASH media presentation. Then, the method 400 may, after accessing the second media presentation, resume access of the DASH media presentation at the given time and in the expressed state based on the one or more parameters.

Figure 5:
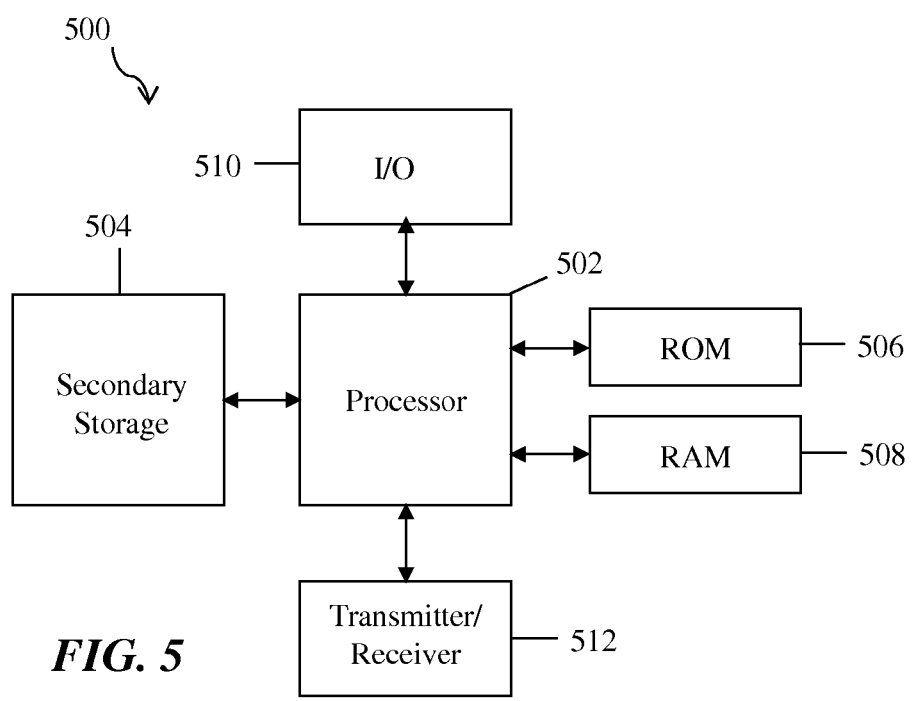
FIG. 5 is a schematic diagram of an embodiment of a network node.

The schemes described above may be implemented on a network component or node, such as a network node with sufficient processing power, memory resources, and network throughput capability to handle the necessary workload placed upon it. FIG. 5 illustrates an embodiment of a computer system or a network node 500 suitable for implementing one or more embodiments of the methods/schemes disclosed herein, such as the method 400. Further, the network node 500 may be configured to implement at least part of any of the apparatuses and systems described herein, such as the streaming client 110, the HTTP server 120, and the HTTP cache 150.

The network node 500 includes a processor 502 that is in communication with memory devices including secondary storage 504, read only memory (ROM) 506, random access memory (RAM) 508, input/output (I/O) devices 510, and transceiver (denoted as transmitter/receiver) 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes or methods described herein, including the method 400. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 may serve as an output and/or input (I/O) device of the network node 500. For example, if the transmitter/receiver 512 is acting as a transmitter, it may transmit data out of the network node 500. If the transmitter/receiver 512 is acting as a receiver, it may receive data into the network node 500. The transmitter/receiver 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 512 may enable the processor 502 to communicate with an Internet or one or more intranets. I/O devices 510 may include a video monitor, liquid crystal display (LCD), touch screen display, or other type of video display for displaying video, and may also include a video recording device for capturing video. I/O devices 510 may also include one or more keyboards, mice, or track balls, or other well-known input devices.

It is understood that by programming and/or loading executable instructions onto the network node 500, at least one of the processor 502, the secondary storage 504, the RAM 508, and the ROM 506 are changed, transforming the network node 500 in part into a particular machine or apparatus (e.g., an HTTP server or a DASH client having the novel functionality taught by the present disclosure). The executable instructions may be stored on the secondary storage 504, the ROM 506, and/or the RAM 508 and loaded into the processor 502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the HTTP server 120) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of Dynamic Adaptive Streaming over Hypertext Transfer Protocol (HTTP) (DASH) comprising:

accessing a DASH media presentation at a given time of a period on a media timeline of the DASH media presentation;

determining one or more parameters to express a state of the DASH media presentation, wherein the parameters comprise a temporal parameter that indicates the given time, a state parameter, and a selection parameter that identifies a single adaptation set group comprising a set of adaptation sets, wherein the given time is relative to a start of the period, and wherein the selection parameter and the state parameter are designed as mutually exclusive; and sharing the DASH media presentation by sending a link comprising the given time to a client device to allow the client device to play the DASH media presentation from the given time.

2. The method of claim 1, further comprising:
specifying the parameters in a media presentation description (MPD) for the DASH media presentation; and
storing the MPD.

3. The method of claim 2, wherein the parameters are specified as MPD anchors using a uniform resource identifier (URI) fragment syntax, and wherein a URI fragment following the URI fragment syntax starts with a "#" character and is a string terminating the URI.

4. The method of claim 3, wherein a key of the temporal parameter is denotable by "t", and wherein a value of the temporal parameter is the given time or a time range including the given time.

5. The method of claim 1, wherein the parameters further comprise a period parameter, wherein a key of the period parameter is denotable by "period", and wherein a value of the period parameter identifies the period on the media timeline.

6. The method of claim 1, wherein the period has an earliest period start time (PeriodStart) among a plurality of periods in the DASH media presentation, and wherein the parameters do not contain any period parameter.

7. The method of claim 1, wherein a key of the state parameter is denotable by "as", and wherein a value of the state parameter identifies a single adaptation set.

8. The method of claim 1, wherein the parameters further comprise a selection parameter, wherein a key of the selection parameter is denotable as "track", and wherein a value of the selection parameter identifies a single adaptation set group comprising a set of adaptation sets.

9. The method of claim 1, further comprising:
accessing a second media presentation that is different from the DASH media presentation; and
after accessing the second media presentation, resuming access of the DASH media presentation at the given time and in the state of the DASH media presentation based on the one or more parameters.

10. The method of claim 1, further comprising:
generating one or more bookmarks indicating the state of the DASH media presentation; and
sharing the state of the DASH media presentation by sending the bookmarks to an over-the-top content (OTT) provider to allow other client devices to play the DASH media presentation from the given time after obtaining the bookmarks from the OTT provider.

11. An apparatus used in Dynamic Adaptive Streaming over Hypertext Transfer Protocol (HTTP) (DASH), the apparatus comprising:
one or more processors configured to:
access a DASH media presentation at a given time of a period on a media timeline of the DASH media presentation;
determine one or more parameters to express a state of the DASH media presentation, wherein the parameters comprise a temporal parameter that indicates the given time, a state parameter, and a selection parameter that identifies a single adaptation set group comprising a set of adaptation sets, wherein the given time is relative to a start of the period, and wherein the selection parameter and the state parameter are designed as mutually exclusive;
specify the parameters in a media presentation description (MPD) for the DASH media presentation;
generate one or more bookmarks indicating the state of the DASH media presentation; and
share the state of the DASH media presentation by sending the bookmarks to an over-the-top content (OTT) provider to allow other client devices to play the DASH media presentation from the given time after obtaining the bookmarks from the OTT provider; and
a memory device coupled to the one or more processors and configured to store the MPD.

12. The apparatus of claim 11, wherein the parameters are specified as MPD anchors using a uniform resource identifier (URI) fragment syntax, wherein a URI fragment following the URI fragment syntax starts with a "#" character and is a string terminating the URI, wherein a key of the temporal parameter is denotable by "t", wherein a value of the temporal parameter is the given time or a time range including the given time, and wherein a format of the temporal parameter is defined in a standard document entitled Media Fragments URI 1.0.

13. The apparatus of claim 11, wherein the parameters further comprise a period parameter, wherein a key of the period parameter is denotable by "period", and wherein a value of the period parameter identifies the period on the media timeline.

14. The apparatus of claim 11, wherein a key of the state parameter is denotable by "as", and wherein a value of the state parameter identifies a single adaptation set.

15. The apparatus of claim 11, wherein the parameters further comprise a selection parameter, wherein a key of the selection parameter is denotable as "track", and wherein a value of the selection parameter identifies a single adaptation set group comprising a set of adaptation sets.

16. The apparatus of claim 11, further comprising sharing the DASH media presentation by sending a link comprising the given time to a second client device to allow the second client device to play the DASH media presentation from the given time.

17. The apparatus of claim 11, wherein the period has an earliest period start time (PeriodStart) among a plurality of periods in the DASH media presentation, and wherein the parameters do not contain any period parameter.

* * * * *